(12) United States Patent
Wei (10) Patent No.: US 7,936,140 B2
(45) Date of Patent: May 3, 2011

(54) TORQUE CONTROL CIRCUIT FOR ELECTRICAL MOTOR

(75) Inventor: Chen-Ku Wei, Taichung Hsien (TW)

(73) Assignee: Mobiletron Electronics Co., Ltd., Taichung Hsien (TW)

( * ) Notice: Subject to any disclaimer, the term of this patent is extended or adjusted under 35 U.S.C. 154(b) by 403 days.

(21) Appl. No.: 12/135,225

(22) Filed: Jun. 9, 2008

(65) Prior Publication Data

US 2009/0302794 A1 Dec. 10, 2009

(51) Int. Cl.
*H02P 7/00* (2006.01)

(52) U.S. Cl. ........ 318/432; 318/434; 323/234; 323/223; 173/176

(58) Field of Classification Search .................. 318/432, 318/434; 173/93.5, 176, 5; 81/52, 467, 57.11, 81/57.38, 60; 73/862.08, 862.23; 323/293, 323/298

See application file for complete search history.

(56) References Cited

U.S. PATENT DOCUMENTS

| | | | | | |
|---|---|---|---|---|---|
| 3,564,372 | A | * | 2/1971 | Vogelsberg et al. | 388/830 |
| 3,920,088 | A | * | 11/1975 | Dudek | 173/169 |
| 4,893,067 | A | * | 1/1990 | Bhagwat et al. | 388/823 |
| 5,014,793 | A | * | 5/1991 | Germanton et al. | 173/181 |
| 5,154,242 | A | * | 10/1992 | Soshin et al. | 173/178 |
| 5,526,460 | A | * | 6/1996 | DeFrancesco et al. | 388/831 |
| 6,696,814 | B2 | * | 2/2004 | Henderson et al. | 318/811 |
| 6,836,614 | B2 | * | 12/2004 | Gilmore | 388/811 |
| 7,112,934 | B2 | * | 9/2006 | Gilmore | 318/432 |
| 7,791,302 | B2 | * | 9/2010 | Krause et al. | 318/503 |
| 2010/0001017 | A1 | * | 1/2010 | Herman et al. | 222/1 |

* cited by examiner

*Primary Examiner* — Rita Leykin
(74) *Attorney, Agent, or Firm* — Leong C. Lei (57) ABSTRACT

The torque control circuit of a hand tool contains a motor driving circuit, a current detection circuit, a reference voltage generation circuit, a current limiting circuit, and a torque configuration circuit. In the last stage of operation of the hand tool and when the average current has reached a predetermined level, the average current is maintained for a period of time to provide a constant average power and therefore to achieve an appropriate tightness of the bolt or nut being operated. The detection and control of current is achieved by a linear circuit which is robust to the heavy noises produced by the motor. A microprocessor is adopted to consider factors such as temperature in determining a suitable current level.

32 Claims, 4 Drawing Sheets

TORQUE CONTROL CIRCUIT FOR ELECTRICAL MOTOR

TECHNICAL FIELD OF THE INVENTION

The present invention generally relates to electrical motors, and more particularly to a torque control circuit for an electrical motor of a hand tool.

DESCRIPTION OF THE PRIOR ART

Electrical hand tools such as screw drivers and wrenches usually contains an internal direct-current (DC) electrical motor providing rotational force to a bolt or nut. In tightening the bolt or nut, usually the hand tool has to deliver a specific torque in the last stage so that the bolt or nut could be appropriately fastened, without being too loosed or too tight.

When resistance is encountered during the course of the electrical motor's operation, its rotational speed would be reduced. A conventional approach is therefore to adjust the output torque of the electrical motor in accordance with the monitored rotational speed of the electrical motor. This approach has a number of disadvantages such as the resolution (thereby, the accuracy) and timeliness in measuring the rotational speed are both insufficient. On the other hand, when resistance is encountered and the electrical motor's rotational speed is reduced, this implies that an internal equivalent impedance of the electrical motor is lowered, the current flowing through the motor and thereby the input power are increased. In contrast to the rotational speed, input power of the electrical motor is a superior candidate in controlling the output torque of the electrical motor. Theoretically, if the voltage applied to the electrical motor is constant and the effect of the electrical motor's operating temperature is ignored, the input power is directly related to the input current, and the output torque of the electrical motor therefore could also be controlled by monitoring the current to the electrical motor. Quite some commercial products, as such, adopt a linear circuit in monitoring the current flowing through the electrical motor.

However, in reality, the voltage applied to the electrical motor is not constant, especially when the electrical motor is powered by a battery. Taking Li battery as an example, its output voltage and current has a corresponding curve and the monitored current to the electrical motor alone does not accurately reflect the power input to the electrical motor. In addition, the working temperature of the electrical motor is actually an important factor. Under different working temperatures, there are different corresponding curves between the electrical motor's output torque and current. Due to these factors, monitoring current flowing through the electrical motor as a basis for torque control is rather inaccurate.

The more ideal way to control output torque of the electrical motor by its input power is to constantly measure both the voltage and current to the electrical motor and then calculate the input power in real time. However, it would be too complicated to achieve this aim by only using linear circuits. More effective approach would be to use logic circuits involving a single-chip controller. Unfortunately, a logic circuit operating around an electrical motor usually suffers heavy noises. To avoid these noises causing misjudgments, a complex filter circuit has to be implemented, which would inevitably introduce time delay into torque control. Together with the time required for calculation the right torque level, the timeliness of this approach is significantly compromised.

SUMMARY OF THE INVENTION

The primary purpose of the present invention is to provide a novel torque control circuit to obviate the foregoing shortcomings of conventional approaches.

The design idea of the present invention is as follows. The function of the electrical motor of a hand tool is to transform the input power into a rotational force to work on a bolt or nut. The tightness of the bolt or nut is related to the average output power in the last stage of the tightening operation.

The average power in the last stage is an integral over time of the current times the voltage. If the voltage is not a constant, the average power would change in accordance with the voltage. To avoid the influence of the voltage, the present invention adopts the following approach. In the last stage of operation and when the current has reached a predetermined level, a constant current circuit of the torque control circuit maintains the current at that level for a period of time. During this period of time, the rotation of the electrical motor would reduce to a very small speed and the internal equivalent impedance of the electrical motor would almost be a constant. The average power, that could also be calculated as the square of the current times the impedance, would therefore be constant, regardless of the voltage. In other words, the tightness of the bolt or nut would correspond to the current flowing through the electrical motor in the last stage.

Since the current is the candidate for control, a linear circuit would be adequate enough for this purpose. The problem of heavy noises produced by the electrical motor is therefore avoided.

As to the effect of temperature in affecting the corresponding curve between the current of the torque of the electrical motor, a microprocessor, as the brain of the torque control circuit, is adopted by the present invention to timely choose an appropriate curve for the constant current control.

The combination of the constant current circuit and the microprocessor could provide an additional benefit in battery over-discharge protection. Based on the monitored voltage, the microprocessor could determine the maximum allowable current drawn from the battery so that the battery is not overly discharged.

In summary, the present invention uses linear circuit in dynamic detection and electrical motor control, and uses a microprocessor for setting the parameters of the linear circuit. The present invention therefore could achieve superior and precise torque control with a significantly simplified and low-cost control circuit.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
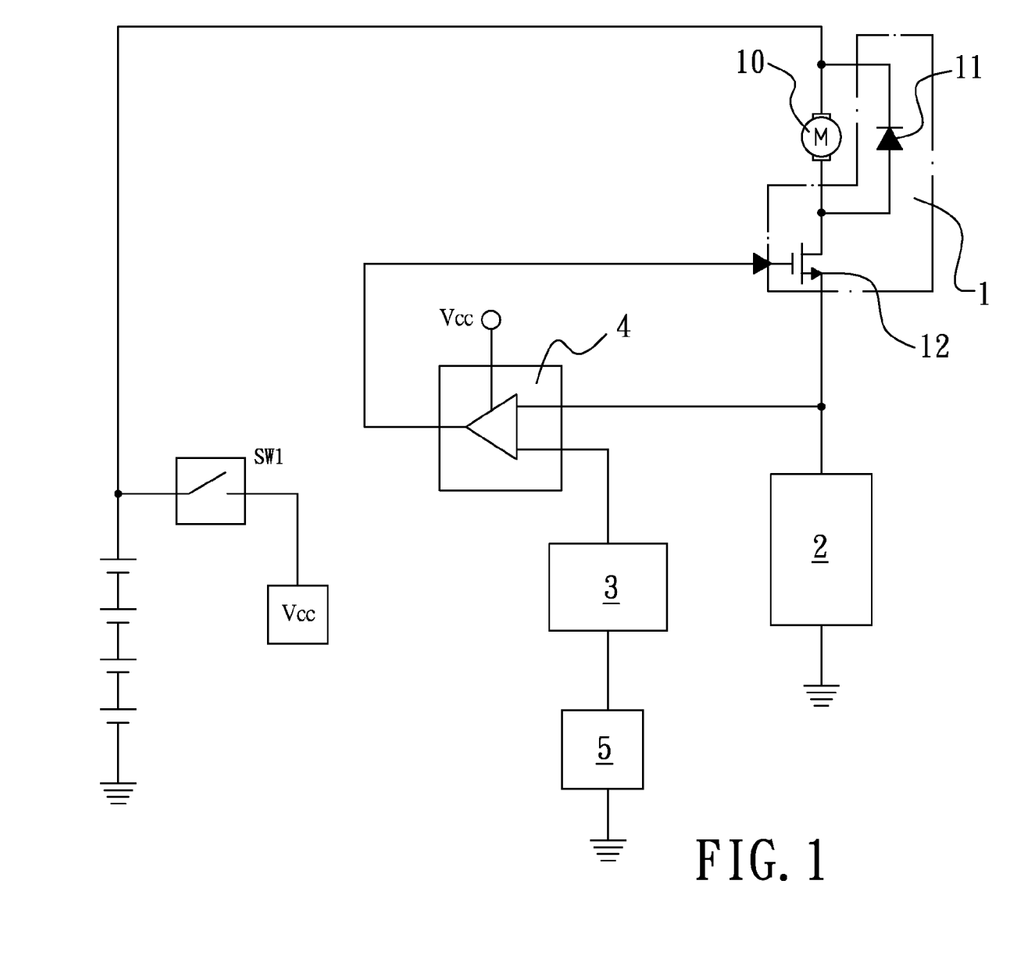
FIG. 1 is a block diagram showing a torque control circuit according to a first embodiment of the present invention.

FIG. 1 is a block diagram showing a torque control circuit according to a first embodiment of the present invention. As illustrated, the present embodiment basically contains a motor driving circuit 1, a current detection circuit 2, a reference voltage generation circuit 3, a current limiting circuit 4, and a torque configuration circuit 5. The motor driving circuit 1 drives a motor 10 and is series-connected to the current detection circuit 2 and ground in this order. The current limiting circuit 4 has two inputs, a first input terminal connected to the junction between the motor driving circuit 1 and the current detection circuit 2, and a second input terminal connected to the reference voltage generation circuit 3 and the torque configuration circuit 5 (so as to receive a reference voltage). An output terminal of the current limiting circuit 4 is connected to a control terminal of the motor driving circuit 1 (to turn on or off the motor driving circuit 1).

Figure 2:
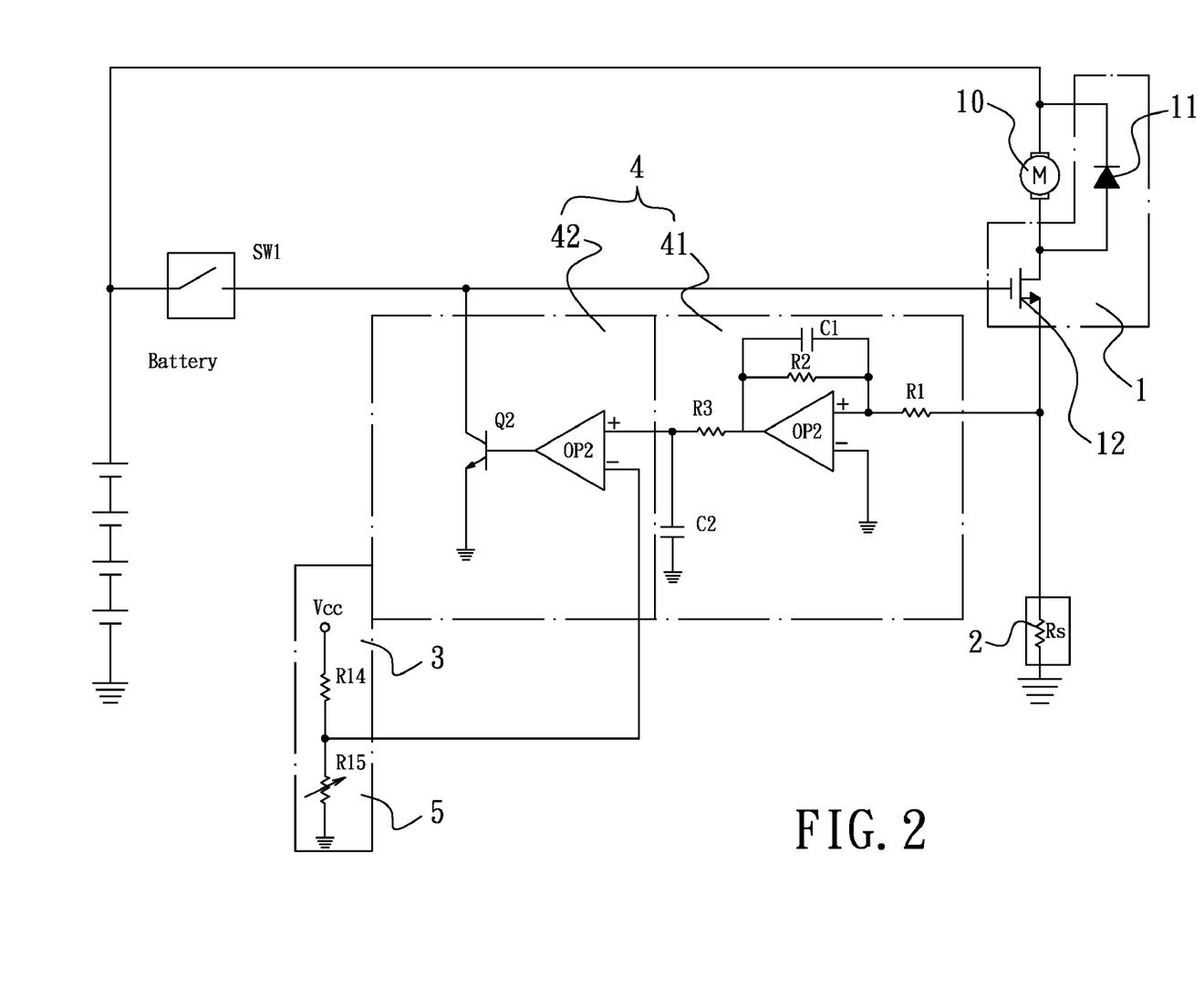
FIG. 2 is a circuit diagram showing an implementation of the block diagram of FIG. 1.

FIG. 2 is a circuit diagram showing an implementation of the block diagram of FIG. 1. As illustrated, the motor driving circuit 1 contains a diode 11 and a semiconductor power element 12 (e.g., a MOSFET transistor or a bipolar transistor). A collector of the semiconductor power element 12 is connected to a second terminal of the motor 10, an emitter of the semiconductor power element 12 is connected to the current detection circuit 2, and a gate of the semiconductor power element 12 (i.e., the control terminal of the motor driving circuit 1) is connected to the output terminal of the current limiting circuit 4. The diode 11 is parallel-connected to the motor 10 with its anode connected to the second terminal of the motor 10 (also, the collector of the semiconductor power element 12) and its cathode to a first terminal of the motor 10.

The current detection circuit 2 is a low-ohm power resistor Rs. When the current flowing through the motor driving circuit 1 and then through the low-ohm power resistor Rs, a sampled voltage Vs corresponding to the current is produced.

The reference voltage generation circuit 3 and the torque configuration circuit 5 are jointly implemented by a resistor R14 and a variable resistor R15 series-connected in this order between a system voltage Vcc of the torque control circuit and ground. A junction between the resistor R14 and the variable resistor R15 is connected to the second input terminal of the current limiting circuit 4. An adjustment means of the variable resistor R15 is exposed outside the hand tool adopting this torque control circuit for easy adjustment. By adjusting the variable resistor R15, a reference voltage Vref corresponding to a desired torque level is produced and delivered to the second input terminal of the current limiting circuit 4.

The current limiting circuit 4 contains a first operational amplification circuit 41 and a second operational amplification circuit 42. The first operation amplification circuit 41 mainly contains an operational amplifier OP1 whose negative input terminal is connected to ground and whose positive input terminal is connected to the first input terminal of the current limiting circuit 4 (and to the junction between the motor driving circuit 1 and the current detection circuit 2) via a resistor R1. The first operation amplification circuit 41 further contains a resistor R2 and a capacitor C1 parallel-connected between the positive input terminal and an output terminal of the operational amplifier OP1, which in turn is connected to ground via series-connected resistor R3 and capacitor C2 in this order.

The second operation amplification circuit 42 mainly contains an operational amplifier OP2 whose positive input terminal is connected to the junction between the resistor R3 and the capacitor C2. By this configuration, the sampled voltage Vs corresponding to the current flowing through the electrical motor 10 is amplified and filtered by the first operation amplification circuit 41 to become a to-be-compared voltage V1. A negative input terminal of the operational amplifier OP2 is connected to the junction between the resistor R14 and the variable resistor R15 and thereby receives the reference voltage Vref. An output terminal of the operational amplifier OP2 is connected to a base of a transistor Q2 whose emitter is connected to ground and whose collector is connected to the gate of the semiconductor power element 12 (i.e., the control terminal of the motor driving circuit 1). By this configuration, the voltage V1 is compared against the reference voltage Vref. When the voltage V1 is lower than the reference voltage Vref, a low output voltage is applied to the gate of the transistor Q2 which is therefore turned off. The voltage from a battery (not numbered) or other electrical power source is directly applied to the gate of the semiconductor power element 12 which in turn allows current to flow through the electrical motor 10. On the other hand, when the voltage V1 is higher than the reference voltage Vref, a high output voltage is applied to the gate of the transistor Q2 which is therefore turned on. As the gate of the semiconductor power element 12 is basically grounded by the conduction of the transistor Q2, no current would flow through the electrical motor 10. However, the electrical motor 10 would not immediately stop as such. As described in the summary of the present specification, when the current flowing through the electrical motor 10 reaches a predetermined level, the current limiting circuit 4 would maintain the current for a period of time. In this way, the uncomfortableness that would arise from the sudden stop of the electrical motor 10 therefore could be avoided.

Figure 3:
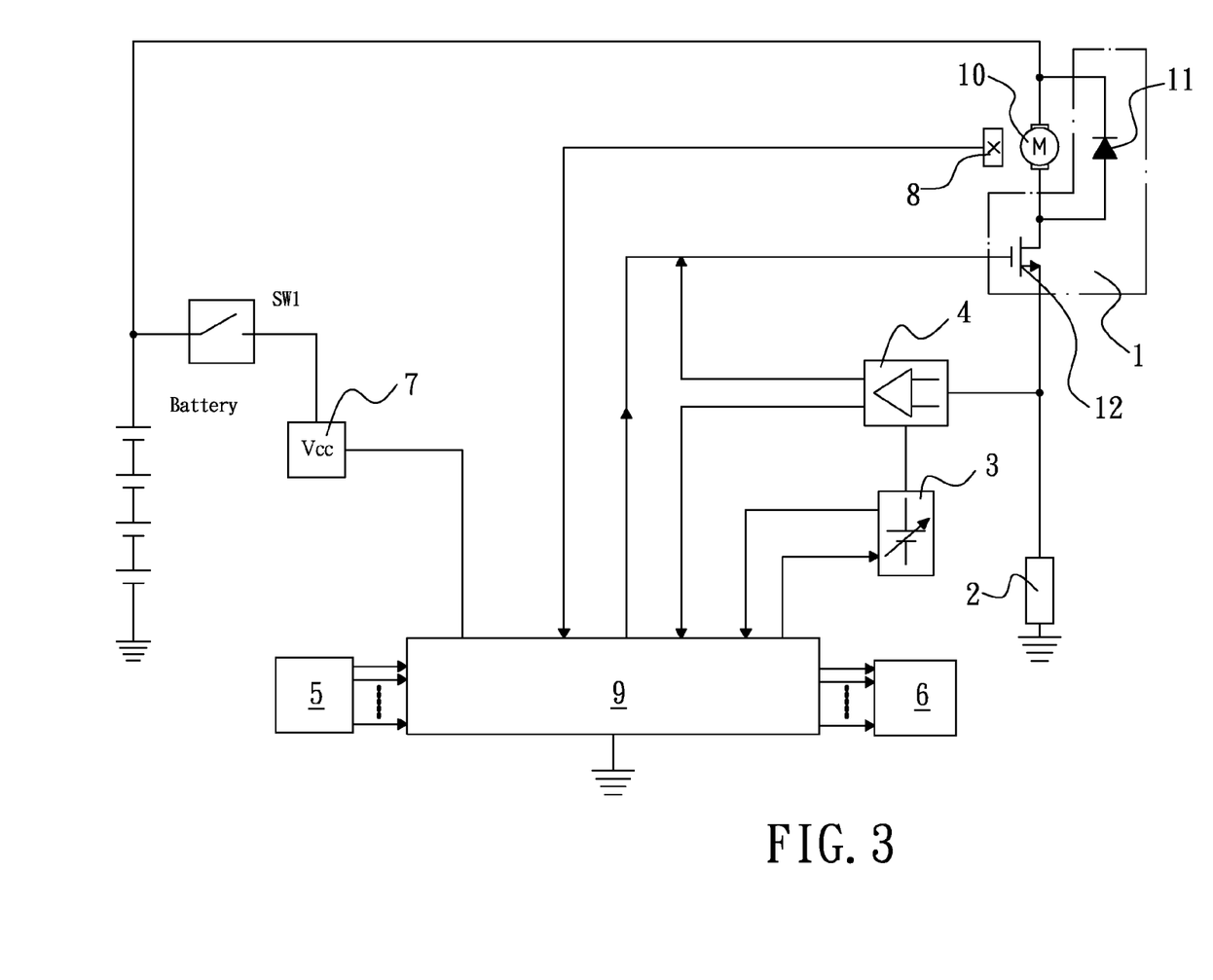
FIG. 3 is a block diagram showing a torque control circuit according to a second embodiment of the present invention.

FIG. 3 is a block diagram showing a torque control circuit according to a second embodiment of the present invention. As illustrated, the present embodiment also contains the motor driving circuit 1, the current detection circuit 2, the reference voltage generation circuit 3, the current limiting circuit 4, and the torque configuration circuit 5, similar to the previous embodiment. Additionally, there are a display circuit 6, a voltage regulating circuit 7, a control circuit 9, and a temperature sensor circuit 8. Please note that the temperature sensor circuit 8 could be omitted in some embodiments. The control circuit 9 mainly contains a controller IC having a number of input and output terminals. The outputs of the reference voltage generation circuit 3, the current limiting circuit 4, the torque configuration circuit 5, and the temperature sensor circuit 8 are connected to appropriate input terminals of the control circuit 9, respectively. The control circuit 9 then sends control signals via appropriate output terminals to the control terminal of the motor driving circuit 1 and the reference voltage generation circuit 3 and displays a current torque value of the electrical motor 10 via the display circuit 6, usually on a display screen of the display circuit 6.

Again, the motor driving circuit 1 contains a diode 11 connected across an electrical motor 10, and a semiconductor power element 12 (e.g., a MOSFET transistor or a bipolar transistor) positioned between the electrical motor 10 and the current detection circuit 2. A gate of the semiconductor power element 12 is connected to the control terminal of the motor driving circuit 1 (therefore, to an output terminal of the current limiting circuit 4 and an appropriate output terminal of the control circuit 9).

When a switch SW1 of the hand tool is closed, the voltage from the battery or other electrical source is regulated by the voltage regulating circuit 7 and a stable voltage is provided to the torque control circuit (such as to a power supply terminal of the control circuit 9). At this moment, the control circuit 9 keeps the semiconductor power element 12 at a turned-off state so that the electrical motor 10 is not operational. In the mean time, the control circuit 9 obtains a desired torque level from the torque configuration circuit 5, which mainly contains a variable resistor with an adjustment means exposed outside the hand tool. The desired torque level is displayed via the display circuit 6. The control circuit 9 also obtains a current temperature of the electrical motor 10 via the temperature sensor circuit 8. The control circuit 9 then could determine from an internal mapping table (regarding the relationship between the temperature, voltage, torque, and current) an appropriate reference voltage value. The control circuit 9 then instructs the reference voltage generation circuit 3 to produce the reference voltage to the current limiting circuit 4.

The control circuit 9 then turns on the semiconductor power element 12 to conduct the motor driving circuit 1 so that the electrical motor 10 starts to run. As a bolt or nut driven by the electrical motor 10 is tightened, the resistance increases, the rotational speed of the electrical motor 10 decreases, and the current flowing through the electrical motor 10 also increases. As the current flowing through the current detection circuit 2, a corresponding voltage is produced and picked up by the current limiting circuit 4. When the corresponding voltage has not yet reached the reference voltage, the semiconductor power element 12 remains turned on and the electrical motor 10 continues to run. When the corresponding voltage obtained by the current detection circuit 2 exceeds the reference voltage, the current limiting circuit 4 turns off the semiconductor power element 12. The current flowing through the electrical motor 10 is thereby cut off. On the other hand, the current detection circuit 2 produces no corresponding voltage and the current limiting circuit 4 again turns on the semiconductor power element 12. The electrical motor 10 therefore starts to run. Immediately, the increasing resistance and current causes the current detection circuit 2 to produce a corresponding voltage again higher than the reference voltage. The current flowing through the electrical motor is cut off again. In this way, the semiconductor power element 12 is repeatedly turned on and off and, on the average, the current flowing through the electrical motor 10 would be maintained at a predetermined level.

As the average current reaches the predetermined level and as the control circuit 9 senses this phenomenon, the control circuit 9 would turn off the semiconductor power element 12 after a period of time (i.e., maintain the average current at the predetermined level for a period of time). The turning off of the semiconductor power element 12 by the control circuit 9 could be achieved by a pulse-width-modulated square wave whose width is gradually decreased so as to reduce the uncomfortableness and impact of the electrical motor 10's momentum when it is stopped. When the electrical motor 10 completely stops, its internal impedance would be at a constant and, as the average current is also at the predetermined level, the average output power of the electrical motor 10 would generally be a constant. As such, the bolt or nut would be fastened at a desired tightness.

The control circuit 9 is therefore the brain of the present embodiment. It is capable of providing some additional functions. For example, it is able to show, via the display circuit 6, the predetermined torque level, the desired torque level after adjustment, the final torque level achieved, or the average power. The control circuit 9 could also provide additional protection to the battery of the hand tool. For example, when the voltage of the battery drops to a certain level or the temperature is above a certain degree, the control circuit 9 could prevent the setting of the desired torque level to be beyond an appropriate level. To achieve the preciseness of the produced torque under the influence of various parts variations, the mapping table of the control circuit 9 mentioned earlier could be fine-tuned after the hand tool is assembled (i.e., by the so-called in-ckt programming).

Figure 4:
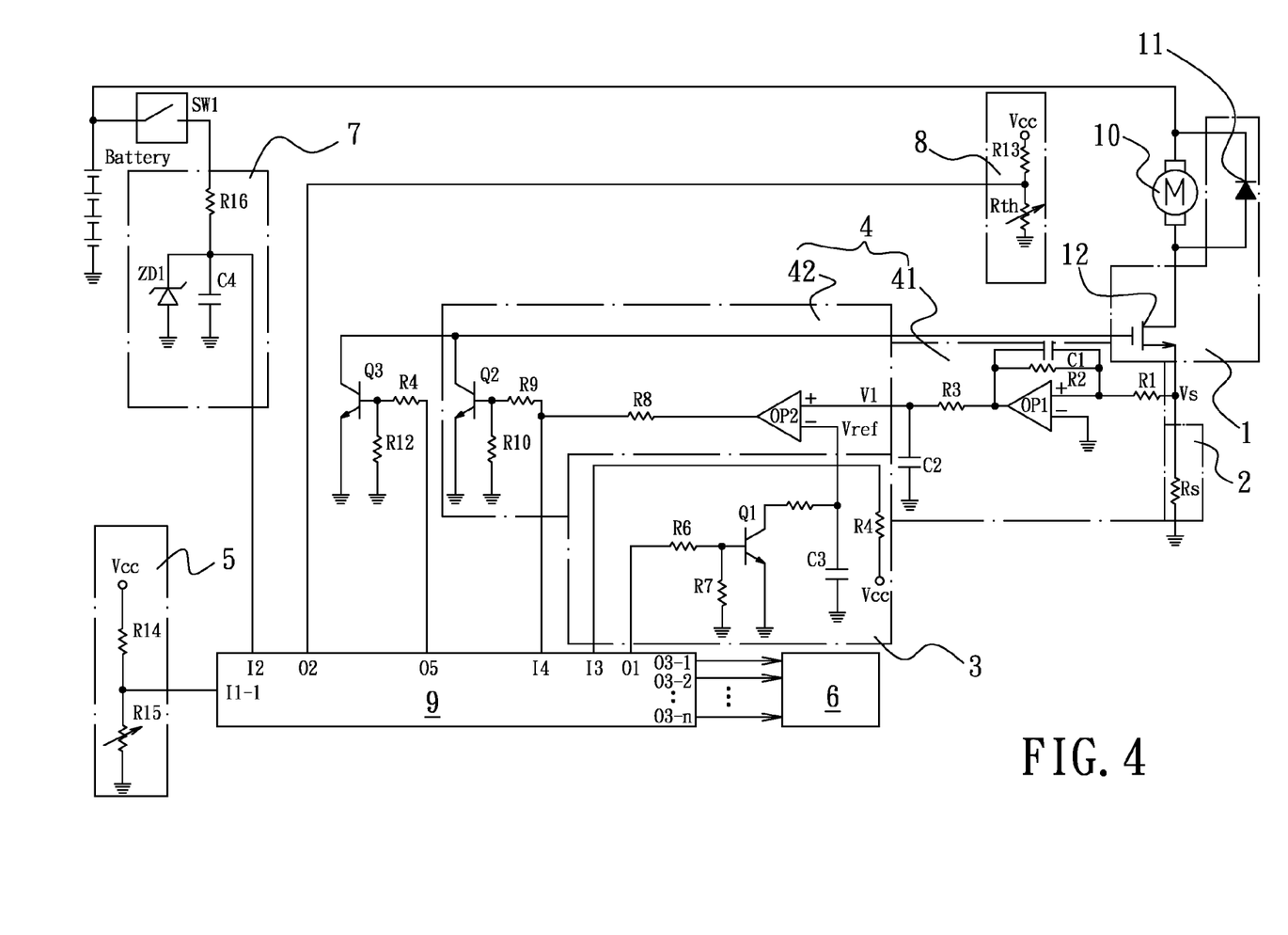
FIG. 4 is a circuit diagram showing an implementation of the block diagram of FIG. 3.

FIG. 4 is a circuit diagram showing an implementation of the block diagram of FIG. 3. As illustrated, the current detection circuit 2 is a low-ohm power resistor Rs. When the current flowing through the motor driving circuit 1 and then through the low-ohm power resistor Rs, a sampled voltage Vs corresponding to the current is produced.

The reference voltage generation circuit 3 mainly contains a transistor Q1 whose base is connected to an output terminal of the control circuit 9 via a resistor R6 and to ground via a resistor R7. The emitter of the transistor Q1 is connected to ground, and the collector is connected to a second input terminal of the current limiting circuit 4 via a resistor R5. The second input terminal of the current limiting circuit 4 is also connected to ground via a capacitor C3, to the system voltage Vcc via a resistor R4, and to an input terminal of the control circuit 9.

The current limiting circuit 4 contains a first operational amplification circuit 41 and a second operational amplification circuit 42. The first operation amplification circuit 41 mainly contains an operational amplifier OP1 whose negative input terminal is connected to ground and whose positive input terminal is connected to the first input terminal of the current limiting circuit 4 (and to the junction between the motor driving circuit 1 and the current detection circuit 2) via a resistor R1. The first operation amplification circuit 41 further contains a resistor R2 and a capacitor C1 parallel-connected between the positive input terminal and an output terminal of the operational amplifier OP1.

The second operation amplification circuit 42 mainly contains an operational amplifier OP2 whose positive input terminal is connected to the output terminal of the operational amplifier OP1 via a resistor R3, and is also connected to ground via a capacitor C2. By this configuration, the sampled voltage Vs corresponding the current flowing through the electrical motor 10 is amplified and filtered by the first operation amplification circuit 41 to become a to-be-compared voltage V1. A negative input terminal of the operational amplifier OP2 is connected to the second input terminal of the current limiting circuit 4, thereby receiving a reference voltage Vref from the reference voltage generation circuit 3. An output terminal of the operational amplifier OP2 is connected to an input terminal of the control circuit 9 via a resistor R8, which in turn is connected to a base of a transistor Q2 via a resistor R9. The base of the transistor Q2 is also connected to ground via a resistor R10, the emitter is connected to ground, and the collector is connected to the gate of the semiconductor power element 12. By this configuration, the voltage V1 is compared against the reference voltage Vref. When the voltage V1 is lower than the reference voltage Vref, a low output voltage is applied to the base of the transistor Q2 which is therefore turned off. The semiconductor power element 12 allows current to flow through the electrical motor 10. On the other hand, when the voltage VI is higher than the reference voltage Vref, a high output voltage is applied to the base of the transistor Q2 which is therefore turned on. As the gate of the semiconductor power element 12 is basically grounded by the conduction of the transistor Q2, no current would flow through the electrical motor 10. However, the electrical motor 10 would not immediately stop as such. As described earlier, when the current flowing through the electrical motor 10 reaches a predetermined level, the current limiting circuit 4 would maintain the current for a period of time. As mentioned above, the control circuit 9 could use pulse-width-modulated square wave to gradually turn off the semiconductor power element 12 so as to reduce the uncomfortableness and impact of the electrical motor 10's momentum when it is stopped.

The torque configuration circuit 5 contains a resistor 14 and a variable resistor R15 series-connected in this order between the system voltage Vcc and ground. The junction between the resistor R14 and the variable resistor R15 is connected to an input terminal of the control circuit 9. An adjustment means (e.g., a twisting knob or a lever) of the variable resistor R15 is exposed outside the hand tool for easy adjustment. Together with the display circuit 6, the adjustment means could be used to set a desired torque level or to calibrate.

The display circuit 6 could contain a liquid crystal panel driven by a number of driving transistors interfaced with the control circuit 9. This should be quite well known in the art and is omitted here.

The voltage regulating circuit contains a resistor R16 whose one end is connected a switch SW1 of the hand tool and whose other end is connected to ground via parallel-connected capacitor C4 and Zener diode ZD1 (whose anode is connected to ground) and also to a power supply terminal of the control circuit 9.

The temperature sensor circuit 8 contains a resistor R13 and a thermistor Rth, series-connected in this order between the system voltage Vcc and ground. The junction between the resistors R13 and thermistor Rth is connected an input terminal of the control circuit 9.

In alternative embodiments, the torque configuration circuit 5, the display circuit 6, and the control circuit 9 could be integrated altogether in a single control panel of the hand tool. The toque configuration circuit 5 is not limited to implementations using variable resistor and twisting knobs. In some embodiment, the display circuit 6 contains a touch panel for entering the desired torque level and a digital logic circuit is used adjust the torque level digitally.

The switch SW1 could be an ordinary ON/OFF switch or a VSR switch. In some embodiments, an additional switch is provided to set the rotational direction of the electrical motor 10. These components are quite common and their details are omitted here.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A torque control circuit for an electrical motor of a hand tool, comprising:

a motor driving circuit connected to said electrical motor, said motor driving circuit comprising a diode parallel-connected to said electrical motor and a semiconductor power element series-connected to said electrical motor; a gate of said semiconductor power element being connected to said control terminal of said motor driving circuit; and said semiconductor power element being series-connected to said current detection circuit;

a current detection circuit series-connected to said motor driving circuit;

a current limiting circuit having a first input terminal connected to a junction between said motor driving circuit and said current detection circuit, an output terminal of said current limiting circuit connected to a control terminal of said motor driving circuit, said current limiting circuit comprising a first operational amplification circuit and a second operational amplification circuit; said first operational amplification circuit comprises a first operational amplifier having a negative terminal connected to ground, and a positive terminal connected to said first input terminal of said current limiting circuit and to an output terminal of said first operational amplifier via parallel-connected resistor R2 and capacitor C1; said output terminal of said first operational amplifier connected to ground via series-connected resistor R3 and capacitor C2 in this order; said second operational amplification circuit comprises a second operational amplifier having a positive terminal connected to the junction between said resistor R3 and capacitor C2, and a negative terminal connected to said second input terminal of said current limiting circuit;

a reference voltage generation circuit providing a reference voltage to a second input terminal of said current limiting circuit;

a torque configuration circuit connected to said reference voltage generation circuit so that said reference voltage is produced in accordance with a desired torque level; and a control circuit having a plurality of input terminals connected to said reference voltage generation circuit, said current limiting circuit, and said torque configuration circuit, respectively, said control circuit having a plurality of output terminals connected to said control terminal of said motor driving circuit and said reference voltage generation circuit respectively, said control circuit providing a pulse-width-modulated signal to said control terminal of said motor driving circuit when turning said motor driving circuit off.

2. The torque control circuit according to claim 1, wherein said reference voltage generation circuit and said torque configuration circuit comprises a resistor R14 and a variable resistor R15 series-connected in this order between a system voltage of said torque control circuit and ground; and the junction between said resistors R14 and R15 is connected to said second input terminal of said current limiting circuit.

3. The torque control circuit according to claim 2, wherein said variable resistor R15 is adjusted by a twisting knob.

4. The torque control circuit according to claim 2, wherein said variable resistor R15 is adjusted by a lever.

5. The torque control circuit according to claim 1, wherein said current detection circuit is a low-ohm power resistor.

6. The torque control circuit according to claim 1, wherein said semiconductor power element is a MOSFET transistor.

7. The torque control circuit according to claim 1, wherein said semiconductor power element is a bipolar transistor.

8. A torque control circuit for an electrical motor of a hand tool, comprising:
   a motor driving circuit connected to said electrical motor, said motor driving circuit comprises a diode parallel-connected to said electrical motor and a semiconductor power element series-connected to said electrical motor; a gate of said semiconductor power element being connected to said control terminal of said motor driving circuit; and said semiconductor power element being series-connected to said current detection circuit;
   a current detection circuit series-connected to said motor driving circuit;
   a current limiting circuit having a first input terminal connected to a junction between said motor driving circuit and said current detection circuit, an output terminal of said current limiting circuit connected to a control terminal of said motor driving circuit;
   a reference voltage generation circuit providing a reference voltage to a second input terminal of said current limiting circuit, said reference voltage generation circuit comprising a transistor Q1 whose base is connected to an output terminal of said control circuit via a resistor R6 and to ground via a resistor R7; the emitter of said transistor Q1 is connected to ground; the collector of said transistor Q1 is connected to said second input terminal of said current limiting circuit via a resistor R5; said second terminal of said current limiting circuit is connected to ground via a capacitor C3, to said system voltage via a resistor R4, and to an input terminal of said control circuit;
   a torque configuration circuit;
   a display circuit;
   a control circuit having a plurality of input terminals connected to said reference voltage generation circuit, said current limiting circuit, and said torque configuration circuit, respectively, said control circuit having a plurality of output terminals connected to said control terminal of said motor driving circuit, said reference voltage generation circuit; and said display circuit, respectively, said control circuit providing a pulse-width-modulated signal to said control terminal of said motor driving circuit when turning said motor driving circuit off; and
   a voltage regulating circuit providing a system voltage for said torque control circuit.

9. The torque control circuit according to claim 8, wherein said torque configuration circuit comprises a variable resistor adjustable by a twisting knob exposed outside of said hand tool.

10. The torque control circuit according to claim 8, wherein said current detection circuit is a low-ohm power resistor.

11. The torque control circuit according to claim 8, wherein said torque configuration circuit, said display circuit, and said control circuit are integrated altogether in a single control panel of said hand tool.

12. The torque control circuit according to claim 8, wherein said torque configuration circuit is controlled by a digital logic circuit digitally.

13. The torque control circuit according to claim 8, wherein said display circuit has a touch panel for controlling said torque configuration circuit.

14. The torque control circuit according to claim 8, wherein said toque configuration circuit comprises a resistor 14 and a variable resistor R15 series-connected in this order between said system voltage and ground; and the junction between said resistor R14 and said variable resistor R15 is connected to an input terminal of said control circuit.

15. The torque control circuit according to claim 8, wherein said display circuit comprises a liquid crystal panel driven by a plurality of driving transistors interfaced with said control circuit.

16. The torque control circuit according to claim 8, wherein said voltage regulating circuit comprises a resistor R16 whose one end is connected to a switch SW1 of said hand tool and whose other end is connected to ground via parallel-connected capacitor C4 and Zener diode ZD1 (whose anode is connected to ground) and also to a power supply terminal of said control circuit.

17. The torque control circuit according to claim 8, wherein said current limiting circuit comprises a first operational amplification circuit and a second operational amplification circuit; said first operational amplification circuit comprises a first operational amplifier having a negative terminal connected to ground, and a positive terminal connected to said first input terminal of said current limiting circuit via a resistor R1 and to an output terminal of said current limiting circuit via parallel-connected resistor R2 and capacitor C1; said output terminal of said first operational amplifier connected to ground via series-connected resistor R3 and capacitor C2 in this order; said second operational amplification circuit comprises a second operational amplifier having a positive terminal connected to the junction between said resistor R3 and capacitor C2, and a negative terminal is connected to said second input terminal of said current limiting circuit; an output terminal of said second operational amplifier is connected to an input terminal of said control circuit via a resistor R8, which in turn is connected to the base of a transistor Q2 via a resistor R9; the base of said transistor Q2 is connected to ground via a resistor R10; the emitter of said transistor Q2 is connected to ground; and the collector of said transistor Q2 is connected to said control terminal of said motor driving circuit.

18. The torque control circuit according to claim 8, wherein said semiconductor power element is a MOSFET transistor.

19. The torque control circuit according to claim 8, wherein said semiconductor power element is a bipolar transistor.

20. A torque control circuit for an electrical motor of a hand tool, comprising:
   a motor driving circuit connected to said electrical motor, said motor driving circuit comprising a diode parallel-connected to said electrical motor and a semiconductor power element series-connected to said electrical motor; a gate of said semiconductor power element being connected to said control terminal of said motor driving circuit; and said semiconductor power element being series-connected to said current detection circuit;
   a current detection circuit series-connected to said motor driving circuit;
   a current limiting circuit having a first input terminal connected to a junction between said motor driving circuit and said current detection circuit, an output terminal of said current limiting circuit connected to a control terminal of said motor driving circuit;
   a reference voltage generation circuit providing a reference voltage to a second input terminal of said current limiting circuit, said reference voltage generation circuit comprising a transistor Q1 whose base is connected to an output terminal of said control circuit via a resistor R6 and to ground via a resistor R7; the emitter of said transistor Q1 is connected to ground; the collector of said transistor Q1 is connected to said second input terminal of said current limiting circuit via a resistor R5; said second terminal of said current limiting circuit is connected to ground via a capacitor C3, to said system voltage via a resistor R4, and to an input terminal of said control circuit; and a torque configuration circuit;

a temperature sensor circuit;

a display circuit;

a control circuit having a plurality of input terminals connected to said reference voltage generation circuit, said temperature sensor circuit, said current limiting circuit, and said torque configuration circuit, respectively, said control circuit having a plurality of output terminals connected to said control terminal of said motor driving circuit, said reference voltage generation circuit; and said display circuit, respectively, said control circuit providing a pulse-width-modulated signal to said control terminal of said motor driving circuit when turning said motor driving circuit off; and a voltage regulating circuit providing a system voltage for said torque control circuit.

21. The torque control circuit according to claim 20, wherein said torque configuration circuit comprises a variable resistor adjustable by a twisting knob exposed outside of said hand tool.

22. The torque control circuit according to claim 20, wherein said current detection circuit is a low-ohm power resistor.

23. The torque control circuit according to claim 20, wherein said torque configuration circuit, said display circuit, and said control circuit are integrated altogether in a single control panel of said hand tool.

24. The torque control circuit according to claim 20, wherein said torque configuration circuit is controlled by a digital logic circuit digitally.

25. The torque control circuit according to claim 20, wherein said display circuit has a touch panel for controlling said torque configuration circuit.

26. The torque control circuit according to claim 20, wherein said toque configuration circuit comprises a resistor 14 and a variable resistor R15 series-connected in this order between said system voltage and ground; the junction between said resistor R14 and said variable resistor R15 is connected to an input terminal of said control circuit.

27. The torque control circuit according to claim 20, wherein said display circuit comprises a liquid crystal panel driven by a plurality of driving transistors interfaced with said control circuit.

28. The torque control circuit according to claim 20, wherein said voltage regulating circuit comprises a resistor R16 whose one end is connected a switch SW1 of said hand tool and whose other end is connected to ground via parallel-connected capacitor C4 and Zener diode ZD1 (whose anode is connected to ground) and also to a power supply terminal of said control circuit.

29. The torque control circuit according to claim 20, wherein said temperature sensor circuit comprises a resistor R13 and a thermistor Rth, series-connected in this order between said system voltage and ground; and the junction between said resistors R13 and thermistor Rth is connected to an input terminal of said control circuit.

30. The torque control circuit according to claim 20, wherein said current limiting circuit comprises a first operational amplification circuit and a second operational amplification circuit; said first operational amplification circuit comprises a first operational amplifier having a negative terminal connected to ground, and a positive terminal connected to said first input terminal of said current limiting circuit via a resistor R1 and to an output terminal of said current limiting circuit via parallel-connected resistor R2 and capacitor C1; said output terminal of said first operational amplifier connected to ground via series-connected resistor R3 and capacitor C2 in this order; said second operational amplification circuit comprises a second operational amplifier having a positive terminal connected to the junction between said resistor R3 and capacitor C2, and a negative terminal is connected to said second input terminal of said current limiting circuit; an output terminal of said second operational amplifier is connected to an input terminal of said control circuit via a resistor R8, which in turn is connected to a base of a transistor Q2 via a resistor R9; the base of said transistor Q2 is connected to ground via a resistor R10; the emitter of said transistor Q2 is connected to ground; and the collector of said transistor Q2 is connected to said control terminal of said motor driving circuit.

31. The torque control circuit according to claim 20, wherein said semiconductor power element is a MOSFET transistor.

32. The torque control circuit according to claim 20, wherein said semiconductor power element is a bipolar transistor.

* * * * *